US012584546B2

(12) United States Patent
Strölin et al.

(10) Patent No.:  US 12,584,546 B2
(45) Date of Patent:    Mar. 24, 2026

(54) ELECTRIC DRIVE SYSTEM FOR A MOTOR VEHICLE, IN PARTICULAR FOR AN AUTOMOBILE

(71) Applicant: DAIMLER TRUCK AG, Leinfelden-Echterdingen (DE)

(72) Inventors: Marc Strölin, Neuhausen (DE); Jens Luckmann, Winnenden (DE); Martin Schneider, Fellbach (DE)

(73) Assignee: DAIMLER TRUCK AG, Leinfelden-Echterdingen (DE)

( * ) Notice: Subject to any disclaimer, the term of this patent is extended or adjusted under 35 U.S.C. 154(b) by 0 days.

(21) Appl. No.: 18/710,808

(22) PCT Filed: Nov. 16, 2022

(86) PCT No.: PCT/EP2022/082140
§ 371 (c)(1),
(2) Date: May 16, 2024

(87) PCT Pub. No.: WO2023/088970
PCT Pub. Date: May 25, 2023

(65) Prior Publication Data
US 2025/0003472 A1      Jan. 2, 2025

(30) Foreign Application Priority Data

Nov. 18, 2021    (DE) ..................... 10 2021 005 711.2

(51) Int. Cl.
| | |
|---|---|
| *F16H 37/08* | (2006.01) |
| *B60K 1/00* | (2006.01) |
| *B60K 1/02* | (2006.01) |
| *B60K 11/02* | (2006.01) |
| *B60K 17/16* | (2006.01) |
| *F16H 57/031* | (2012.01) |
| *F16H 57/037* | (2012.01) |
| *F16H 57/04* | (2010.01) |
| *F16H 57/02* | (2012.01) |

(52) U.S. Cl.
CPC ........... *F16H 37/0806* (2013.01); *B60K 1/00* (2013.01); *B60K 1/02* (2013.01); *B60K 11/02* (2013.01);
(Continued)

(58) Field of Classification Search
CPC .............. F16H 37/0806; F16H 37/082; F16H 2200/0034; F16H 2200/0043; B60K 1/00;
(Continued)

(56) References Cited

U.S. PATENT DOCUMENTS

| | | | | |
|---|---|---|---|---|
| 10,994,598 B2 * | 5/2021 | Cho | ........................ | B60K 6/365 |
| 11,525,505 B2 * | 12/2022 | Vincon | ............... | F16H 57/0495 |

(Continued)

FOREIGN PATENT DOCUMENTS

| | | | | |
|---|---|---|---|---|
| CN | 205468311 U | * | 8/2016 | ............... B60K 1/00 |
| CN | 106382349 A | | 2/2017 | |

(Continued)

OTHER PUBLICATIONS

An electric drive transaxle of not coaxial double motors (Year: 2017).*

(Continued)

*Primary Examiner* — Derek D Knight
(74) *Attorney, Agent, or Firm* — Dennemeyer & Associates LLC

(57) ABSTRACT

The invention relates to an electric drive system (10) for a motor vehicle, comprising an electric machine (20) with a rotor (24). A differential (38) with a differential gear (40) is provided. A gear unit (58) is provided, which is arranged in the torque flow between the rotor (24) and the differential gear (40) with respect to a torque flow emanating from the electric machines (20), and has a first input shaft (60) an output shaft (68) arranged parallel and axially offset to the first input shaft (60) and at least two gear wheels (72, 74) arranged coaxially to the first input shaft (60), namely a first gear wheel (72) and a second gear wheel (74), and two gear (Continued)

wheels (76, 78) arranged coaxially to the output shaft (68), namely a third gear wheel (76) and a fourth gear wheel (78).

13 Claims, 2 Drawing Sheets

(52) U.S. Cl.
CPC ......... *B60K 17/165* (2013.01); *F16H 37/082* (2013.01); *F16H 57/031* (2013.01); *F16H 57/037* (2013.01); *F16H 57/0415* (2013.01); *F16H 57/0436* (2013.01); *F16H 57/0483* (2013.01); *F16H 57/0494* (2013.01); *B60K 2001/001* (2013.01); *F16H 2057/02034* (2013.01); *F16H 2057/02052* (2013.01); *F16H 2200/0021* (2013.01); *F16H 2200/0034* (2013.01)

(58) Field of Classification Search
CPC ... B60K 1/02; B60K 17/165; B60K 2001/001
See application file for complete search history.

(56) References Cited

U.S. PATENT DOCUMENTS

2020/0096084 A1    3/2020  Engerman

2021/0008969 A1*    1/2021  Chopra ................ B60K 7/0007
2021/0016651 A1     1/2021  Cho et al.

FOREIGN PATENT DOCUMENTS

| | | | | | | |
|---|---|---|---|---|---|---|
| CN | 106553510 | A | * | 4/2017 | .......... | B60K 17/165 |
| CN | 111169225 | A | | 5/2020 | | |
| CN | 114161878 | A | * | 3/2022 | .......... | F16H 37/046 |
| DE | 102018009582 | A1 | | 6/2020 | | |
| FR | 3089886 | A1 | | 6/2020 | | |
| JP | S58-68226 | U | | 4/1983 | | |
| JP | 2021-85446 | A | | 6/2021 | | |
| WO | 2018061443 | A | | 4/2018 | | |
| WO | WO-2020114827 | A1 | * | 6/2020 | .............. | B60K 1/00 |

OTHER PUBLICATIONS

External electric drive axle structure with double motors (Year: 2022).*
Dumper (Year: 2016).*
International Search Report for PCT/EP2022/082140 mailed on Apr. 12, 2023.

\* cited by examiner

ELECTRIC DRIVE SYSTEM FOR A MOTOR VEHICLE, IN PARTICULAR FOR AN AUTOMOBILE

CROSS-REFERENCE TO RELATED APPLICATIONS

This is a 35 U.S.C. 371 National Stage Patent Application of International Application No. PCT/EP2022/082140, filed Nov. 16, 2022, which claims priority to German application 10 2021 005 711.2, filed Nov. 18, 2021, each of which is hereby incorporated by reference in its entirety.

The present invention relates to an electric drive system for a motor vehicle, in particular for an automobile, according to the generic term of patent claim 1.

DE 10 2018 009 582 A1 describes an electric axle drive for a motor vehicle as known, with at least one electric motor, with a differential that can be driven by the electric motor and with a first housing part that at least partially surrounds the differential gear. A second housing part, which is separate from the first housing part and at least partially surrounds the electric motor, is also provided.

The object of the present invention is to create an electric drive system for a motor vehicle so that a particularly compact design can be realized.

This object is achieved by an electric drive system for a motor vehicle with the features of claim 1. Advantageous embodiments with useful further embodiments of the invention are described in the remaining claims.

The present invention relates to an electric drive system for a motor vehicle, in particular for an automobile. This means that the motor vehicle, which is preferably designed as an automobile, most preferably as a commercial vehicle, has the electric drive system in its completely manufactured state and can be driven electrically, in particular purely electrically, by means of the electric drive system. In particular, in its fully manufactured state, the motor vehicle has at least or exactly two axles arranged one behind the other in the longitudinal direction of the vehicle and thus sequential. The respective axle has at least or exactly two wheels, also referred to as vehicle wheels, which are arranged in particular on opposite sides of the motor vehicle in the transverse direction of the vehicle. The electric drive system is thereby assigned to one of the axles, for example, so that the wheels of the one axle to which the electric drive system is assigned can be driven by means of the electric drive system. When the wheels are referred to in the following, unless otherwise specified, this means the wheels of the one axle that can be driven by means of the electric drive system and to which the electric drive system is assigned. The wheels are ground contact elements of the motor vehicle, which can be supported or braced on the ground via the ground contact elements in the vertical direction of the vehicle. If the motor vehicle is driven along the ground while the motor vehicle is supported on the ground via the wheels in the vertical direction of the vehicle, the wheels roll on the ground. In order to drive the motor vehicle along the ground, for example, the wheels and thus the motor vehicle are driven by means of the electric drive system. The electric drive system is therefore an electric drive device for driving the wheels and thus the motor vehicle, in particular purely electrically.

Where ordinal numerals referred to as ordinals, such as "first", "second" and so forth, are also used in the context of the present disclosure, the ordinal numerals do not necessarily indicate an order, in particular unless otherwise indicated. The ordinal numerals, unless otherwise specified, do not necessarily mean that several elements must be provided. In other words, for example, the mention of a first element does not necessarily mean that a second element is or must also be provided. Rather, ordinal numerals are used in the context of the present disclosure, in particular, to distinguish between identical terms to which the ordinal numerals refer and thus to be able to address them unambiguously and without contradiction.

The electric drive system has a first electric machine, which has a first rotor. For example, the first electric machine has a first stator, by means of which the first rotor can be driven and thereby rotated relative to the first stator about an axis of rotation of the first rotor, also referred to as the first machine's axis of rotation. The first electric machine can provide torques via the first rotor, in particular for driving the motor vehicle and, in particular, for driving the wheels. The electric drive system also has a differential transmission, also known simply as a differential, which has a differential gear in the form of a crown wheel or spur gear, for example. The differential gear is a gear wheel that has teeth, in particular external teeth. The torque that can be provided or is provided by the first machine is fed into the differential via the differential gear, allowing the differential to be driven. In particular, this allows the differential gear, for example, to be rotated about the axis of rotation of the differential gear, also referred to as the differential gear axis of rotation, in particular relative to the stator. In particular, it may be provided that the differential is assigned to the aforementioned one axle to which the electric drive system is also assigned. This means, for example, that the wheels of one axle can be driven by the electric machine, in particular by the rotor, via the differential. As is already sufficiently known from the general prior art, the differential is designed, for example, to transmit or distribute the respective torque provided by the first electric machine via the first rotor to the wheels. Furthermore, as is generally known, the differential is preferably designed to allow different speeds of the wheels, for example when the motor vehicle is cornering, in particular while the wheels can be driven or are driven by the first electric machine, in particular by the first rotor, via the differential. In particular, the differential allows the wheel on the outside of the bend to rotate at a higher speed than the wheel on the inside of the bend, for example.

The electric drive system also has a gear unit provided in addition to the differential, which is arranged in the torque flow between the first rotor and the differential gear with regard to a torque flow emanating from the first electric machine, in particular from the first rotor, via which the torques can be transmitted from the first rotor to the differential gear and can be introduced into the differential via the differential gear. This means that the gear unit is arranged in the torque flow in relation to the torque flow, downstream of the first rotor and upstream of the differential gear. The gear unit has a first input shaft, which is also referred to as the first transmission input shaft. The gear unit also has an output shaft, which is also referred to as the transmission output shaft. The transmission output shaft is arranged parallel and axially offset to the first input shaft. This means in particular that the first input shaft can be rotated about a first input shaft axis of rotation, in particular offset from the stator, and the transmission output shaft can be rotated about an axis of rotation of the output shaft, also referred to as the output shaft axis of rotation, in particular relative to the stator, the first input shaft axis of rotation and the output shaft axis of rotation running parallel to one another and being spaced apart from one another.

The gear unit also has two gear wheels arranged coaxially to the first input shaft and preferably also coaxially to each other, namely a first gear wheel and a second gear wheel. The gear unit also has two gear wheels arranged coaxially to the output shaft and thus also coaxially to each other, namely a third gear wheel and a fourth gear wheel. For example, the third gear wheel meshes with the first gear wheel. Alternatively, or in addition, the fourth gear wheel meshes with the second gear wheel. This means, for example, that the third gear wheel can be driven by the first gear wheel. Alternatively, or in addition, the fourth gear wheel can be driven by the second gear wheel. For example, the first gear wheel and/or the second gear wheel can be driven by the first input shaft. For this purpose, for example, the first gear wheel and/or the second gear wheel can be connected or are connected to the first input shaft in a torque-transmitting, in particular torsionally rigid, manner. Furthermore, it is conceivable that the first gear wheel and/or the second gear wheel are arranged on the first input shaft. Furthermore, it is conceivable that the output shaft can be driven by the third gear wheel and/or by the fourth gear wheel. The third gear wheel and/or the fourth gear wheel can be arranged on the output shaft. In particular, it is conceivable that the third gear wheel and/or the fourth gear wheel can be connected or are connected to the output shaft in a torsionally rigid manner.

The electric drive system also comprises a one-piece drive housing in which the first electric machine and the gear unit are each accommodated at least partially, in particular at least predominantly and thus more than half or completely. In particular, it is provided that the first rotor, the differential gear, the first input shaft, the output shaft and the gear wheels are rotatable relative to the drive housing. In particular, it can be provided that the first stator is connected to the drive housing in a torsionally rigid manner, i.e., is fixed to the drive housing in a torsionally rigid manner. The feature that the drive housing is designed in one piece can be understood in particular to mean that the drive housing is not composed and constructed from housing parts that are designed separately from one another and connected to one another, but rather that the drive housing is preferably formed from one piece, in particular from a single piece, and is thus designed as a monobloc. In other words, the drive housing is an integral body, i.e., an integral body that is therefore manufactured or formed in one piece. In particular, it is thereby conceivable that the drive housing is manufactured by casting and/or forming.

The electric drive system also comprises an axle housing, which is provided in particular in addition to the drive housing and is preferably designed separately from the drive housing, and which can be designed in one or more parts. The feature that the axle housing can be designed in several parts means in particular that the axle housing can be constructed or assembled from several housing elements that are designed separately from one another and connected to one another. The differential is accommodated in the axle housing, in particular in such a way that the differential gear and the differential gear axis of rotation can be rotated relative to the axle housing. In particular, it is conceivable that the first rotor, the differential gear, the first input shaft, the output shaft and the gear wheels are rotatable relative to the axle housing.

The axis of rotation of the first rotor, i.e., the machine's axis of rotation, the axis of rotation of the output shaft, i.e., the output shaft axis of rotation, and the axis of rotation of the differential gear, i.e., the differential gear axis of rotation, are arranged parallel and offset to each other. The machine's axis of rotation, the output shaft axis of rotation and the differential gear axis of rotation are also referred to collectively as the first axes of rotation. It is therefore provided that the first axes of rotation run parallel to each other and are spaced at a distance from each other.

The drive housing and the axle housing are directly connected to one another by means of a first flange joint. In particular, this means that the drive housing and the axle housing are not connected to each other by means of a further housing element that is separate from the drive housing and separate from the axle housing, but the drive housing and the axle housing are connected directly to each other by means of the first flange joint. A first flange face surface of the first flange joint is thereby arranged parallel to the axis of rotation of the differential gear. For example, the drive housing has at least one first flange, whereby the drive housing has at least one second flange, for example. The first flange and the second flange are also referred to as connecting flanges and are flanges of the first flange joint, wherein the drive housing and the axle housing are directly connected to each other via the first flange and the second flange, for example in such a way that the first flange and the second flange are connected to each other, in particular directly. In particular, it may be provided that the first flange and the second flange are screwed together, especially directly, and thus connected to each other. In particular, the first flange and the second flange are connected to each other in the first flange face surface, in particular in such a way that the first flange and the second flange are supported against each other, in particular directly, in the first flange face surface. Thus, for example, the first flange face surface is a first separating plane in which the first flange and the second flange are supported against and/or connected to each other, in particular directly.

In order to realize a particularly compact design and to keep the number of sealing surfaces particularly low and/or to be able to integrate advantageous, planar sealing surfaces, it is provided according to the invention that the first rotor and the, in particular all, gear wheels of the gear unit are arranged completely inside the drive housing.

The expression that an element is "inside the drive housing" means that the element does not protrude through an outer enveloping surface of the drive housing, the outer enveloping surface being formed by an outer surface of a wall of the drive housing and—where the drive housing has openings or flanges—by flange surfaces or opening surfaces.

The drive housing and the axle housing are also referred to collectively as the housing. Furthermore, according to the invention, a first cover and a second cover are provided, it being preferably provided that the first cover and the second cover are formed separately from one another. Furthermore, it is preferably provided that the first cover and the second cover are formed separately from the housing. The first cover and the drive housing are directly connected to each other by means of a second flange joint, whereby the previous and following explanations regarding the first flange joint can also be applied accordingly to the second flange joint and vice versa. The second and the drive housing are directly connected to each other by means of a third joint, whereby the previous and following explanations regarding the first flange joint and the second flange joint can also be applied accordingly to the third flange joint and vice versa. Thus, for example, the cover has a third flange and the drive housing has at least one fourth flange, the third flange and the fourth flange being flanges of the second flange joint. The third flange and the fourth flange are thereby directly connected to each other, in particular in such a way that the third flange and the fourth flange are, for example, screwed together and thereby connected to each other. The second cover has, for example, a fifth flange, and the drive housing has, for example, at least one sixth flange, wherein the fifth flange and the sixth flange are flanges of the third flange joint. For example, the fifth flange and the sixth flange are directly connected to each other, in particular in such a way that the fifth flange and the sixth flange are directly screwed together and thus connected to each other.

Furthermore, according to the invention, it is provided that a second flange face surface of the second flange joint and a third flange face surface of a third flange joint are arranged perpendicular to the axis of rotation of the differential gear, i.e., to the differential gear axis of rotation. As already explained for the first flange joint, it is conceivable that the third flange and the fourth flange are connected to and/or supported against each other in the second flange face surface, in particular directly. Accordingly, it is conceivable that the fifth flange and the sixth flange of the third flange face surface are connected to and/or supported against each other, in particular directly. For example, the second flange face surface and the third flange face surface run parallel to each other, with the second flange face surface and the third flange face surface being spaced at a distance from each other. Furthermore, the second flange face surface and the third flange face surface, for example, run perpendicular to the first flange face surface. The invention makes it possible to keep the number of parts and thus the costs, weight and installation space requirement of the electric drive system particularly low. In addition, the number of sealing surfaces can be kept to a minimum so that the sealing effort and therefore the costs can be kept to a minimum. In particular, at least one of the housings can be designed as a slide-in housing, in particular in such a way that, for example, the first electric machine and/or the gear unit can be pushed into the drive housing, in particular through a respective through-hole opening, wherein, for example, a first of the through-hole openings is closed by the first cover and a second through-hole opening is closed by the second cover. Alternatively, or in addition, the differential, for example, can be inserted into the axle housing, also referred to as the axle bridge, in particular via a third through-hole opening, which is closed, for example, by the housings being connected to each other. It is thus conceivable that the first through-hole opening and the second through-hole opening are through-hole openings of the drive housing, whereby, for example, the through-hole opening of the drive housing can be arranged on opposite sides of the drive housing, in particular when viewed along the machine's axis of rotation.

In particular, the invention enables a simple and space-saving combination of the first electric machine and a gear unit in the form of the gear unit including the differential, which is designed, for example, as an axle drive or is also referred to as an axle drive. It is thereby conceivable that the drive housing and the covers connected to it as well as the first electric machine and the gear unit form a unit or a modular unit or a compound structure, whereby the unit or the compound structure can simply be connected to the axle bridge, and thus to the axle housing, in particular bolted on. Furthermore, it is conceivable to attach the first electric machine to the system by a flange as a so-called stand-alone solution.

In order to realize a particularly compact design of the electric drive system, it is provided in one embodiment of the invention that the gear unit has a countershaft arranged parallel and axially offset to the first input shaft and parallel and axially offset to the output shaft. This means in particular that the countershaft can be rotated relative to the housings about an axis of rotation of the countershaft, also referred to as the countershaft axis of rotation, wherein the countershaft axis of rotation runs parallel to the first input shaft axis of rotation and parallel to the output shaft axis of rotation and is spaced at a distance from the first input shaft axis of rotation and from the output shaft axis of rotation. A switchable spur gear pair is thereby provided, which comprises the first gear wheel and a first countershaft gear arranged coaxially to the countershaft, the countershaft gear being provided in addition to the gear wheels of the gear unit, i.e., in addition to the first, second, third and fourth gear wheels. Furthermore, a second switchable spur gear pair is provided, which comprises the second gear wheel and a second countershaft gear arranged coaxially to the counter-shaft, wherein the second countershaft gear is provided in addition to the first countershaft gear and in addition to the first, second, third and fourth gear wheels of the gear unit. In particular, it is thereby provided that the first gear wheel meshes with the first countershaft gear, and preferably the second gear wheel meshes with the second countershaft gear. The first gear wheel and the first countershaft gear are also collectively referred to as first spur gear pairing, and the second gear wheel and the second countershaft gear are also collectively referred to as second spur gear pairing. The feature that the respective spur gear pair is switchable can be understood to mean the following in particular: At least or exactly one of the respective spur gear pairings is designed, for example, as an idler gear, which is arranged on the first input shaft or on the countershaft so that it can rotate. In particular, it is thereby conceivable that the first gear wheel and the second gear wheel are designed as respective idler gears, which are arranged on the first input shaft so that they can rotate. Furthermore, it is conceivable that the counter-shaft gears are connected to the countershaft in a torsionally rigid manner, in particular permanently.

The feature that two elements, such as the respective countershaft gear and the countershaft, are connected to each other in a torsionally rigid manner is to be understood as meaning that the elements are arranged coaxially to each other and then, when they are connected to each other in a torsionally rigid manner, rotate at the same angular speed, in particular when the elements are driven.

The feature that two elements, such as the respective countershaft gear and the countershaft, are permanently connected to each other in a torsionally rigid manner is to be understood in particular as meaning that a switching element is not provided which can be switched between a connection state connecting the elements to each other in a torsionally rigid manner and a release state in which the connection element allows a relative rotation between the elements, in particular about the common axis of rotation, but rather that the elements are permanently, i.e., permanently or always connected to each other in a torsionally rigid manner. In other words, a torsionally rigid connection between two elements means that these two elements are arranged coaxially to each other and are connected in such a way that they rotate or are rotated at the same angular speed, in particular when they are driven.

With regard to the respective switchable spur gear pair, the feature that the respective spur gear pair is switchable means in particular that a switching device is provided which is preferably switchable between at least one first coupling state, at least one second coupling state and, for example, at least one decoupling state. In the first coupling state, one of the idler gears is connected to the first input shaft or to the countershaft in a torsionally rigid manner by means of the switching device, in particular while the other idler gear can be rotated relative to the first input shaft or relative to the countershaft, in particular about the first input shaft axis of rotation or about the countershaft axis of rotation, meaning that the switching device permits relative rotation between the other idler gear and the first input shaft or countershaft, in particular about the first input shaft axis of rotation or about the countershaft axis of rotation. In the second coupling state, the other idler wheel is connected to the first input shaft or to the countershaft in a torsionally rigid manner by means of the switching device, in particular while the one idler wheel can be rotated about the first input shaft axis of rotation or about the countershaft axis of rotation relative to the first input shaft or relative to the countershaft. The decoupling state can be dispensed with, for example.

In the preferably but optionally provided decoupling state of the switching device, both the one idler gear and the other idler gear can be rotated in particular about the first input shaft axis of rotation or about the countershaft axis of rotation relative to the first input shaft or relative to the countershaft. It is therefore preferable for the switching device in the decoupling state to allow both a relative rotation between the first idler gear and the first input shaft or the countershaft, in particular about the first input shaft axis of rotation or about the countershaft axis of rotation, and a relative rotation between the other idler gear and the first input shaft or countershaft, in particular about the first input shaft axis of rotation or about the countershaft axis of rotation. In this way, for example, an advantageous switch-ability and thus an advantageous drivability of the drive system can be realized in a particularly space-saving manner.

A further embodiment is characterized by the fact that the axis of rotation of the countershaft, i.e., the countershaft axis of rotation, the axis of rotation of the output shaft, i.e., the output shaft axis of rotation, and the axis of rotation of the differential gear, i.e., the differential gear axis of rotation, are all arranged or extend at least essentially in a first common plane. As a result, the installation space requirement of the electric drive system can be kept to a particularly low level.

In order to be able to realize a particularly compact and thus space-saving design of the electric drive system, it is provided in a further embodiment of the invention that the gear unit has a first partial gear comprising the first spur gear pair and the second spur gear pair and a second partial gear. The second partial gear is arranged in the torque flow and connected downstream in the first partial gear. This means that the second partial gear is arranged downstream of the first partial gear and, in particular, upstream of the differ-ential, in particular the differential gear, in the torque flow. Thus, for example, the differential gear and therefore the differential can be driven by the first partial gear via the second partial gear, wherein, for example, the second partial gear can be driven by the first rotor via the first partial gear, and wherein the first partial gear can be driven by the first rotor. The second partial gear comprises the output shaft and a planetary gear set arranged coaxially to the output shaft, which is provided in particular in addition to the gear wheels and in addition to the countershaft gears. In particular, it is preferable that the countershaft gears are also arranged in the drive housing. Furthermore, it is preferable for the counter-shaft to be arranged in the drive housing. It is also preferably provided that the first partial gear and the second partial gear are arranged in the drive housing. Very preferably, the planetary gear set is also arranged in the drive housing.

In order to be able to keep the installation space require-ment of the electric drive system particularly low, it is provided in a further embodiment of the invention that the planetary gear set is arranged axially overlapping the first rotor. In particular, this means that the planetary gear set is at least partially overlapped or covered in the radial direction of the planetary gear set, i.e., that at least one longitudinal region of the planetary gear set extending in particular in the axial direction of the planetary gear set is outwardly over-lapped or covered at least by a longitudinal region of the first rotor extending in the axial direction of the first rotor. In addition, a high degree of ease of assembly can be realized in this way, in particular in that, for example, the first electric machine and the planetary gear set are mounted from a first side of the drive housing and the remaining gear unit is mounted from a second side of the drive housing opposite the first side, in particular moved into the drive housing and thus arranged in the drive housing.

In order to be able to provide a particularly advantageous drive for the motor vehicle in a particularly space-saving manner, it is provided in a further embodiment of the invention that the electric drive system has a second electric machine with a second rotor arranged inside the drive housing, from which the differential gear can be driven via the gear unit. In particular, the rotor can be rotated relative to the drive housing about an axis of rotation of the second rotor, also referred to as the second machine's axis of rotation. For example, the second electric machine com-prises a second stator, by means of which the second rotor can be driven and thereby rotated about the second machine's axis of rotation relative to the second stator and relative to the drive housing. In particular, it is conceivable that the machine's axes of rotation run parallel to each other and are spaced at a distance from each other.

In order to keep the installation space requirement of the electric drive system particularly low, it is provided in a further embodiment of the invention that the first partial gear comprises a second input shaft arranged coaxially to the second rotor. In particular, the second input shaft can be rotated relative to the drive housing about an axis of rotation of the second input shaft, also referred to as the second input shaft axis of rotation. In particular, the first input shaft can be driven by the first rotor and can therefore be rotated about the first input shaft axis of rotation relative to the drive housing. For example, the first rotor is or can be connected to the first input shaft in a torsionally rigid manner, in particular permanently. Alternatively, or in addition, for example, the second rotor is or can be connected to the second input shaft in a torsionally rigid manner, in particular permanently. In particular, the second input shaft can be driven by the second rotor and thereby rotated in the second input shaft axis of rotation relative to the drive housing.

Preferably, a third switchable spur gear pair is provided, which comprises a fifth gear wheel arranged coaxially to the second input shaft and the first countershaft gear. Very preferably, a fourth switchable spur gear pair is provided, which comprises a sixth gear wheel arranged coaxially to the second input shaft and the second countershaft gear wheel. The previous and following explanations for the first spur gear pair or second spur gear pair can be easily applied to the third spur gear pair and the fourth spur gear pair. In particular, the fifth gear wheel meshes with the first coun-tershaft gear wheel. Alternatively, or in addition, the sixth gear wheel meshes with the second countershaft gear. In particular, the previous and following explanations regard-ing the first gear wheel and the second gear wheel can be applied to the fifth gear wheel and the sixth gear wheel and vice versa. The fifth gear wheel and the sixth gear wheel as well as the second input shaft are also preferably arranged in the drive housing.

In order to keep the installation space requirement particularly low, it is provided in a further embodiment of the invention that the axis of rotation of the first rotor, i.e., the first machine's axis of rotation, and the axis of rotation of the second rotor, i.e., the second machine's axis of rotation, are arranged or run in a second common plane.

In order to realize a particularly low installation space requirement, it has proven to be particularly advantageous if the second plane is arranged or runs at least essentially perpendicular to the first plane.

In a further, particularly advantageous embodiment of the invention, the electric drive system has a first oil chamber, which is designed to cool and lubricate the first rotor. Furthermore, it is preferable for the electric drive system to have a second oil chamber that is formed separately from the first oil chamber and is formed for cooling and lubricating the gear unit and the differential. The respective oil chamber means in particular that the respective oil chamber can be supplied with an oil acting as a lubricant and/or coolant, in particular in such a way that the oil can be introduced into the respective oil chamber, in particular in such a way that an oil mist and/or an oil sump is formed in the respective oil chamber. Components arranged in the respective oil chamber splash in the oil sump, for example, and/or are at least partially surrounded by the oil mist and are thus supplied with the oil contained in the respective oil chamber and subsequently lubricated and/or cooled by means of the oil. This means that cooling and lubrication can be provided as required in a particularly space-saving manner.

In order to be able to realize particularly advantageous lubrication and cooling in a particularly space-saving and cost-effective manner, it is provided in a further embodiment of the invention that the electric drive system has a mechanical oil pump which can be driven by or via the gear unit, in particular mechanically, for supplying the second oil chamber with oil, the mechanical oil pump being arranged on a side of the first cover facing away from the gear unit. This means that the oil can be conveyed by means of the oil pump in such a way that the oil can be fed to the second oil chamber, in particular it can be introduced into the first oil chamber.

It has been shown to be particularly advantageous if the mechanical oil pump has a pump housing and a pump impeller arranged inside the pump housing, which is advantageously arranged coaxially to the output shaft and is particularly advantageously connected to a shaft of the second partial gear. Thus, for example, the pump impeller can be driven mechanically by the output shaft or another shaft of the second partial gear arranged coaxially to it and can thus be rotated relative to the housings, in particular about the output shaft axis of rotation. The pump housing is preferably formed separately from the covers and separately from the housings and is connected at least indirectly, in particular directly, to one of the housings.

In order to keep the installation space requirement of the electric drive system particularly low, it is provided in a further embodiment of the invention that a first oil cooler for cooling the oil is arranged inside the pump housing. As a result, the external dimensions of the electric drive system in particular can be kept small, while the oil can be cooled advantageously at the same time.

Ultimately, it has been shown to be particularly advantageous if the electric drive system has a cooling module for supplying the first oil chamber with oil. The cooling module thereby has an electric pump by means of which the oil can be fed into the first oil chamber, i.e., can be conveyed into the first oil chamber. The electric pump can be driven electrically. In particular, this can be understood as meaning that the electric pump has a second pump impeller and an electric motor, by means of which the second pump impeller can be driven in order to convey the oil to and in particular into the first oil chamber. In addition, the cooling module preferably has a second oil cooler, which can be used to cool the oil conveyed in particular by the electric pump. The cooling module is arranged on a side of the axle housing facing away from the gear unit, which means that the installation space requirement can be kept particularly low.

Also disclosed is a motor vehicle preferably designed as an automobile, in particular as a commercial vehicle, which has an electric drive system according to the invention and can thus be driven by means of the electric drive system, in particular purely electrically. Advantages and advantageous embodiments of the electric drive system are to be regarded as advantages and advantageous embodiments of the motor vehicle and vice versa.

It is preferably provided that at least one or more oil channels through which the oil can flow extend inside the first cover and inside the drive housing, for example in order to guide and in particular distribute the oil delivered by means of the mechanical oil pump, in particular to and in particular into the second oil chamber.

It is also conceivable that at least one or more line elements, for example designed as oil hoses and through which the oil conveyed by the electric oil pump can flow, lead from the cooling module at least to the first rotor, in particular to the rotors, in order to thereby supply at least the first rotor, in particular the rotors, with the oil conveyed in particular by the electric oil pump. In particular, it is conceivable that the line element or line elements lead from the cooling module to the stator's winding heads in order to supply the stator winding heads in particular with the oil conveyed by the electric oil pump. The respective line element is thus used to feed the oil to the respective rotor and to the stator winding heads of the respective stator. Furthermore, it is conceivable that at least one or more further line elements are provided, which are designed as oil hoses, for example, and are used as return lines, for example to drain the oil from the rotors and the stator winding heads, in particular back to the cooling module. Furthermore, it is possible that, for example, lines designed as hoses or also referred to as hoses, in particular as water hoses, or at least one line, in particular from the cooling module, lead to the stator or stators, whereby a coolant, in particular comprising water and preferably liquid, can flow through the lines, for example, whereby the respective stator can be supplied with the coolant, for example, and thereby cooled. This enables particularly advantageous stator cooling.

The first oil cooler arranged in the pump housing of the mechanical oil pump is a separate oil cooler of the mechanical oil pump, so that the oil conveyed by the mechanical pump and in particular conveyed to the second oil chamber can be cooled by means of the first oil cooler. In other words, the oil conveyed by the mechanical pump can flow through the first oil cooler, in particular on its way from the mechanical oil pump to the second oil chamber, so that the oil conveyed by the mechanical oil pump is cooled on its way from the mechanical oil pump to the second oil chamber by means of the first oil cooler.

In the context of the present disclosure, elements that are arranged completely within the drive housing are to be understood to mean that these elements do not partially protrude from the drive housing through flange face surfaces defined by flange halves of the drive housing, but are arranged completely within a space of the drive housing delimited by housing walls and flange face surfaces. The third switchable spur gear pair and the fourth switchable spur gear pair as well as the planetary gear set are also preferably arranged completely within the drive housing. In particular, the aforementioned flange halves are to be understood as the aforementioned flanges, so that the respective flange is or forms each of the flange halves.

Further advantages, features and details of the invention can be seen from the following description of a preferred exemplary embodiment and from the drawing. The features and combinations of features mentioned above in the description as well as the features and combinations of features mentioned below in the description of the figures and/or shown alone in the figures can be used not only in the combination indicated in each case, but also in other combinations or on their own, without departing from the scope of the invention.

The drawing depicts as per:

Identical or functionally identical elements are marked with the same reference signs in the figures.

Figure 1:
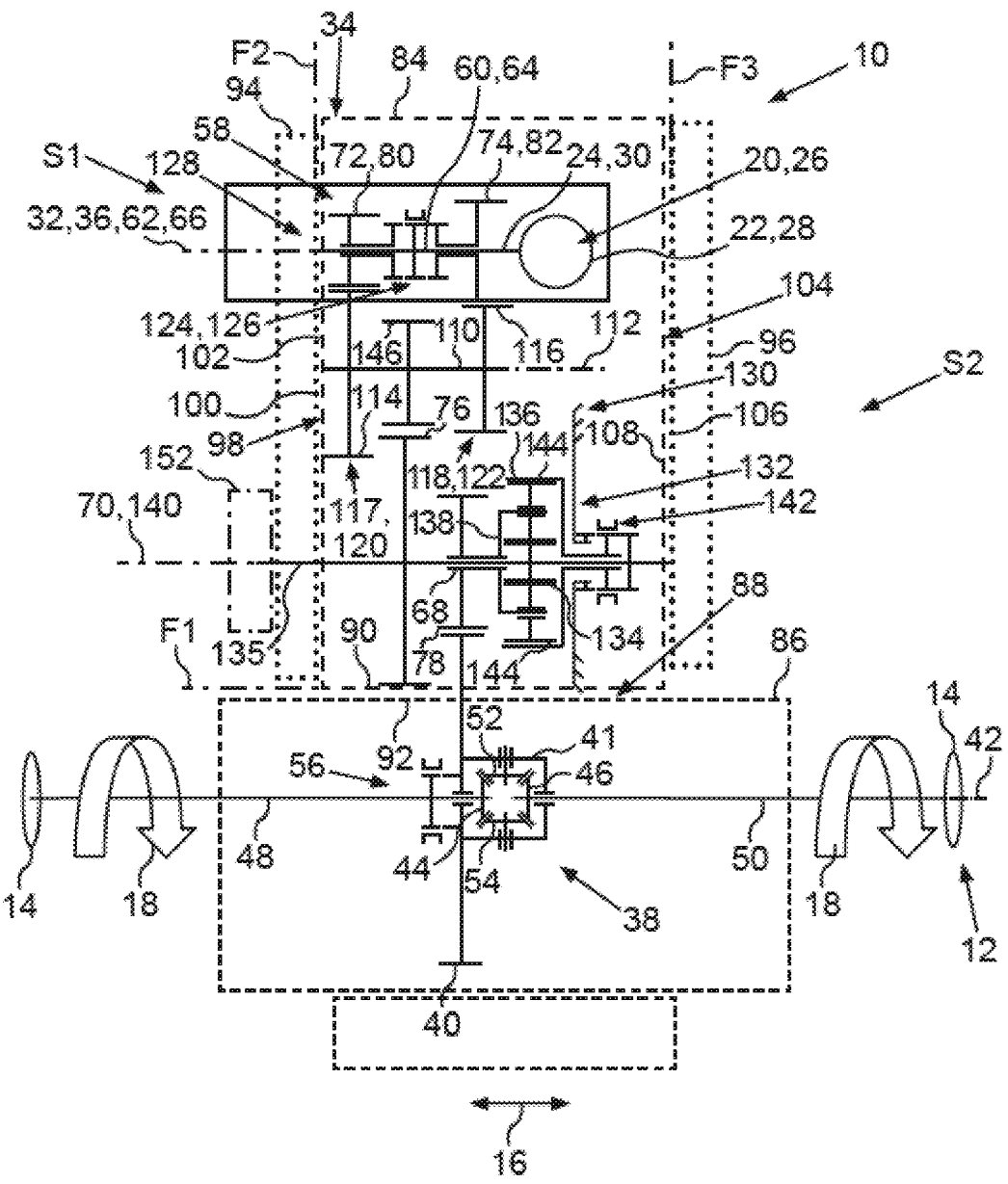
FIG. 1 shows a schematic representation of an electric drive system for a motor vehicle.

FIG. 1 shows a schematic representation of an electric drive system 10 for a motor vehicle. This means that the motor vehicle, which is preferably designed as an automobile, in particular as a commercial vehicle, has the electric drive system 10 in its completely manufactured state and can be driven electrically, in particular purely electrically, by means of the electric drive system 10. It can be seen from FIG. 1 that the drive system 10 is part of an axle 12 of the motor vehicle, also referred to as the vehicle axle. The axle 12 has at least or exactly two wheels 14, also referred to as vehicle wheels, which are arranged in particular on opposite sides of the motor vehicle in the transverse direction of the vehicle. The transverse direction of the vehicle, which is also referred to as the y-direction, is indicated by a double arrow 16 in FIG. 1. The wheels 14 and thus the motor vehicle 1 can be driven by means of the electric drive system 10, in particular purely electrically, and can thus be rotated, for example as illustrated by arrow 18 in FIG. 1, in particular relative to a structure of the motor vehicle not shown in detail in the figures.

The electric drive system 10 has a first electric machine 20, which has a first stator 22 and a first rotor 24. Furthermore, in the embodiment shown in the figures, the drive system 10 has a second electric machine 26 with a second stator 28 and a second rotor 30. For the sake of clarity and since the electric machines 20 and 26 are very similar or even identical in terms of their functions, particularly with regard to driving the motor vehicle, the electric machines 20 and 26 are not shown separately in FIG. 1, but are shown congruently. The first rotor 24 can be driven by means of the first stator 22 and can be rotated about a first machine's axis of rotation 32 relative to a housing device 34 of the drive system 10. The second rotor 30 can be driven by means of the second stator 28 and can be rotated about a second machine's axis of rotation 36 relative to the housing device 34. For the sake of clarity and simplicity, the machine's axes of rotation 32 and 36 are shown congruently in FIG. 1, i.e., in such a way that they coincide. In fact, however, the electric machines 20 and 26 are separate components, so that the electric machine 26 is provided in addition to the electric machine 20 and vice versa. It is thereby provided that the rotors 24 and 30 are arranged parallel and axially offset to one another, so that the machine's axes of rotation 32 and 36 do not actually coincide, but are spaced at a distance from one another and run parallel to one another. The respective machine's axis of rotation 32 or 36 is also referred to as the respective axis of rotation of the respective rotor 24 or 30. The respective electric machine 20 or 26 can provide torques via its respective rotor 24 or 30, in particular for driving the wheels 14 and thus the motor vehicle, in particular purely electrically.

The drive system 10 further has a differential 38 associated with the axle 12 and assigned to the two electric machines 20 and 26, which is also referred to simply as a "differential". In the embodiment shown in the figures, the differential 38 is designed as a bevel gear differential. The differential 38 is part of the axle 12. The differential 38 has a differential gear 40, for example in the form of an input spur gear, via which the torques provided by the electric machines 20, 26 via their rotors 24, 30 can be introduced into the differential 38, whereby the differential 38 can be driven. In other words, the electric machines 20 and 26 can drive the differential gear 40 and thus the differential 38 via their rotors 24 and 30, in particular by means of the aforementioned torques, whereby the differential gear 40 or the differential 38 as a whole can be rotated about a differential gear axis of rotation 42 relative to the housing device 34. The differential gear axis of rotation 42 is also referred to as the axis of rotation of the differential gear 40.

It is advantageously provided here that the differential gear axis of rotation 42 extends parallel to the machine's axes of rotation 32, 36 and is spaced apart from the machine's axes of rotation 32, 36. It can be seen that the torques provided by the electric machines 20 and 26 via their rotors 24 and 30 can be transmitted to the wheels 14 via the differential 38 and, in particular, divided or distributed, so that the wheels 14 can be driven by the differential 38 and, via the differential 38, by the rotors 24 and 30. The differential 38 has a differential cage 41 which is connected, in particular permanently, to the differential gear 40 in a torsionally rigid manner and can therefore be rotated with the differential gear 40 about the differential gear axis of rotation 42 relative to the housing device 34. In the present case, the differential 38 has output gears 44 and 46 in the form of bevel gears. A first output gear 44 of the output gears 44, 46 is connected, in particular permanently, in a torsionally rigid manner to a first axle shaft 48, so that the wheel 14 on the left relative to the image plane of FIG. 1 can be driven by the first output gear 44 via the axle shaft 48. A second output gear 46 of the output gears 44, 46 is connected, in particular permanently, in a torsionally rigid manner to a second axle shaft 50, so that the wheel 14 on the right relative to the image plane of FIG. 1 can be driven by the second output gear 46 via the axle shaft 50. The output gears 44 and 46 mesh with the compensating gears 52 and 54 of the differential 38, which are designed as bevel gears, for example. The compensating gears 52 and 54 are held on the differential cage 41 so that they can rotate with the differential cage 41 and the differential gear 40 about the differential gear axis of rotation 42 relative to the housing device 34. Thus, the output gears 44 and 46 and with them the axle shafts 48 and 50 can be driven by the compensating gears 52 and 54 and via these by the differential cage 41 and differential gear 40.

In the embodiment shown in the figures, the differential 38 advantageously has a differential lock 56, by means of which the differential 38 can be locked, in particular completely, so that the compensating gears 52 and 54 and the output gears 44 and 46 then rotate with the differential cage 41 and the differential gear 40 as a block.

Furthermore, the electric drive system 10 has a gear unit 58 provided in addition to the differential 38, which is arranged in the torque flow between the rotors 24 and 30 and the differential gear 40 with regard to a torque flow emanating from the respective electric machine 20 or 26, via which the torques can be transmitted from the respective rotor 24 or 30 to the differential 38 and thereby to the differential gear 40 and can be introduced into the differential 38 via the differential gear 40. This means that the gear unit 58 is arranged in the torque flow downstream of the rotors 24 and 30 and upstream of the differential gear 40.

The gear unit 58 has a first input shaft 60, which in the present case can be driven by the first rotor 24 and can thus be rotated about a first input shaft axis of rotation 62 relative to the housing device 34. In the embodiment example shown in FIG. 1, the first input shaft axis of rotation 62 coincides with the first machine's axis of rotation 32, as the first input shaft 60 is arranged coaxially with the first rotor 24. In particular, it is provided that the first input shaft 60 is connected to the first rotor 24 in a torsionally rigid manner, in particular permanently.

Since the second electric machine 26 is also provided in the embodiment shown in FIG. 1, the gear unit 58 also has a second input shaft 64, which can be rotated about a second input shaft axis of rotation 66 relative to the housing device 34. Due to the simplified representation of FIG. 1, the input shaft rotation axes 62 and 66 are shown as coincident. In fact, however, and as can be seen in the side view shown in FIG. 2, it is intended that the input shaft axes of rotation 62 and 66 run parallel to one another and are spaced at a distance from one another. Preferably, it is provided that the input shaft axis of rotation 66 coincides with the second machine's axis of rotation 36, and preferably the second input shaft 64 is arranged coaxially with the second rotor 30. In particular, it is provided that the second input shaft 64 is connected to the second rotor 30 in a torsionally rigid manner, in particular permanently. It is provided that the second input shaft 64 can be driven by the second rotor 30 and is consequently can be rotated about the second input shaft axis of rotation 66 relative to the housing device 34.

The gear unit 58 also has an output shaft 68 arranged parallel and axially offset to the input shafts 60 and 64, which can be rotated about an output shaft axis of rotation 70 relative to the housing device 34. Thus, the output shaft axis of rotation 70 runs parallel to the machine's axes of rotation 32 and 36 and parallel to the input shaft axes of rotation 62 and 66, the output shaft axis of rotation 70 being spaced at a distance from the machine's axes of rotation 32 and 36 and from the input shaft axes of rotation 62 and 66.

The gear unit 58 has two gear wheels 72 and 74 arranged coaxially with the first input shaft 60, wherein the gear wheel 72 is also referred to as the first gear wheel and the gear wheel 74 is also referred to as the second gear wheel. In addition, the gear unit 58 comprises gear wheels 76 and 78 arranged coaxially with the output shaft 68, wherein the gear wheel 76 is also referred to as the third gear wheel and the gear wheel 78 is also referred to as the fourth gear wheel. In the embodiment shown in FIG. 1, the gear unit 58 also has a fifth gear wheel 80 and a sixth gear wheel 82. The gear wheels 80 and 82 are arranged coaxially to the second input shaft 64.

The electric drive system 10 also has a drive housing 84 formed in one piece, which is also referred to as an axle slide-in housing. The electric machines 20 and 26 and the gear unit 58 are each accommodated at least partially in the drive housing 84, in particular in each case at least predominantly and thus in each case at least more than half or else in each case completely.

Furthermore, the drive system 10 comprises an axle housing 86, also referred to as an axle bridge, which is preferably formed separately from the drive housing 84 and is connected to the drive housing 84. The differential 38 is accommodated, in particular completely, in the axle housing 86. The first machine's axis of rotation 32, also referred to as the axis of rotation of the first rotor 24, the second machine's axis of rotation 36, also referred to as the axis of rotation of the second rotor 30, the output shaft axis of rotation 70, also referred to as the axis of rotation of the output shaft 68, and the differential gear axis of rotation 42, also referred to as the axis of rotation of the differential gear 40, are arranged parallel to and axially offset from one another, and thus run parallel to one another and are spaced at a distance from each other.

Furthermore, it is provided that the drive housing 84 and the axle housing 86 are directly connected to each other by means of a first flange joint 88. The first flange joint 88 comprises exactly one first flange 90 of the drive housing 84 and exactly one second flange 92 of the axle housing 86, wherein the flanges 90 and 92 are directly connected to one another, in particular directly bolted to one another, in a first flange face surface F1 of the first flange joint 88. It can be seen that the first flange face surface F1 of the first flange joint 88 is parallel to the differential gear axis of rotation 42 and is spaced at a distance from the differential gear axis of rotation 42. Furthermore, it is preferably provided that the first flange face surface F1 runs parallel to the machine's axes of rotation 32 and 36, parallel to the input shaft axes of rotation 62 and 66 and parallel to the output shaft axis of rotation 70 and is spaced at a distance from the machine's axes of rotation 32 and 36, from the input shaft axes of rotation 62 and 66 and from the output shaft axis of rotation 70.

In order to now be able to realize a particularly compact design of the electric drive system 10, it is further provided that the first rotor 24, the second rotor 30 and the, in particular all, gear wheels 72, 74, 76, 78, 80 and 82 of the gear unit 58 are arranged completely within the drive housing 84.

The electric drive system thereby comprises a first cover 94 and a second cover 96. The drive housing 84 and the axle housing 86 are also referred to as housing or housing parts, the drive housing 84 and the axle housing 86 being components, and thus housings, of the housing device 34. The covers 94 and 96, which are also components of the housing device 34, are formed separately from each other and separately from the housings, that is, separately from the drive housing 84 and separately from the axle housing 86. It can be seen that the first cover 94 is arranged on a first side S1 of the drive housing 84, and the second cover 96 is arranged on a second side S2 of the drive housing 84, the sides S1 and S2 being opposite one another or facing away from one another as viewed in the axial direction of the gear unit 58 and thus along the respective input shaft axis of rotation 62 or 66 and along the output shaft axis of rotation 70. The cover 94 completely closes a first through-hole opening of the drive housing 84 arranged on the side S1. In addition, a second through-hole opening of the drive housing 84 arranged on the second side S2 is completely closed by the second cover 96.

The first cover 94 and the drive housing 84 are directly connected to one another by means of a second flange joint 98. The second flange joint 98 comprises exactly one third flange 100 of the cover 94 and exactly one second fourth 102 of the axle housing 84, wherein the flanges 100 and 102 are directly connected to one another, in particular directly bolted to one another, in a second flange face surface F2 of the second flange joint 98. The second cover 96 and the drive housing 84 are directly connected to each other by means of a third flange joint 104. The third flange joint 104 comprises exactly one fifth flange 106 of the second cover 96 and exactly one sixth flange 108 of the axle housing 84, wherein the flanges 106 and 108 are directly connected to one another, in particular directly bolted to one another, in a third flange face surface F3 of the third flange joint 104.

It can be seen from FIG. 1 that the second flange face surface F2 of the second flange joint 98 and the third flange face surface F3 of the third flange joint 104 run perpendicular to the differential gear axis of rotation 42.

Furthermore, the second flange face surface F2 of the second flange joint 98 and the third flange face surface F3 of the third flange joint 104 are arranged parallel to each other and at a distance from each other.

The gear unit 58 has a countershaft 110 which can be rotated about a countershaft axis of rotation 112 relative to the housing device 34. It can be seen that the countershaft axis of rotation 112 extends parallel to the machine's axes of rotation 32 and 63, parallel to the input shaft axes of rotation 62 and 66, parallel to the output shaft axis of rotation 70 and parallel to the differential gear axis of rotation 42, being spaced at a distance from the machine's axes of rotation 32 and 36, from the input shaft axes of rotation 62 and 66, from the output shaft axis of rotation 70 and from the differential gear axis of rotation 42. A first switchable spur gear pair 117 is thereby provided, which comprises the first gear wheel 72 and a first countershaft gear 114 arranged coaxially to the countershaft 110.

In the embodiment shown in FIG. 1, the first countershaft gear 114 is permanently connected to the countershaft 110 in a torsionally rigid manner. In addition, the countershaft gear wheel 114 meshes with the first gear wheel 72. In other words, the gear wheel 72 meshes with the first countershaft gear 114.

Furthermore, a second switchable spur gear pair 118 is provided, which comprises the second gear wheel 74 and a second countershaft gear 116. The second countershaft gear 116 is arranged coaxially to the countershaft 110 and thus coaxially to the first countershaft gear 114. In the embodiment shown in FIG. 1, the second countershaft gear 116 is connected to the countershaft 110 in a torsionally rigid manner, in particular permanently. In addition, the second gear wheel 74 meshes with the second countershaft gear 116.

In the embodiment shown in FIG. 1, a third switchable spur gear pair 120 is provided, which comprises the fifth gear wheel 80 and the first countershaft gear 114. The fifth gear wheel 80 thereby meshes with the countershaft gear 114, wherein preferably the fifth gear wheel 80 does not mesh with the first gear wheel 72. Furthermore, a fourth switchable spur gear pair 122 is provided, which comprises the sixth gear wheel 82 and the second countershaft gear 116. The sixth gear wheel 82 thereby meshes with the second countershaft gear 116, wherein it is preferably provided that the sixth gear wheel 82 does not mesh with the second gear wheel 74.

In the embodiment shown in FIG. 1, the gear wheels 72, 74, 80 and 82 are designed as switchable idler gears. Alternatively, as is known to the person skilled in the art, the countershaft gears 114, 116 could also be designed as switchable idler gears. It is known to the person skilled in the art that in the case of a switchable spur gear pair in which two gear wheels mesh with each other, at least one of the two meshing gear wheels must be designed as a switchable idler gear, with the other of these two gear wheels normally being designed as a fixed gear.

In the embodiment shown in FIG. 1, the gear wheels 72 and 74 are arranged coaxially with and rotatably on the first input shaft 60, and the gear wheels 80 and 82 are arranged coaxially with and rotatably on the second input shaft 64.

A first switching device 124, which can be switched between at least a first coupling state, at least a second coupling state and at least a first decoupling state, is assigned to the gear wheels 72 and 74, which are designed as idler gears. In the first coupling state, the first gear wheel 72 is connected to the input shaft 60 in a torsionally rigid manner by means of the switching device 124, while the second gear wheel 74 can be rotated about the input shaft axis of rotation 62 relative to the input shaft 60. In the second coupling state, the gear wheel 74 is connected to the input shaft 60 in a torsionally rigid manner by means of the switching device 124, while the gear wheel 72 can be rotated about the input shaft axis of rotation 62 relative to the input shaft 60. In the first decoupling state, both gear wheels 72 and 74 can be rotated about the input shaft axis of rotation 62 relative to the input shaft 60. In the embodiment, the first switching device 124 is thus configured as a combined switching device for both gear wheels 72 and 74. Alternatively, and in a manner also known per se, each of the two gear wheels 72 and 74 could be provided with its own switching device.

A second switching device 126, which can be switched between a third coupling state, a fourth coupling state and a second decoupling state, is assigned to the gear wheels 80 and 82, which are designed as idler gears. In the third coupling state, the fifth gear wheel 80 is connected to the input shaft 64 in a torsionally rigid manner by means of the switching device 126, while the sixth gear wheel 82 can be rotated about the input shaft axis of rotation 62 relative to the input shaft 64. In the fourth coupling state, the fifth gear wheel 82 is connected to the input shaft 64 in a torsionally rigid manner by means of the switching device 126, while the sixth gear wheel 80 can be rotated about the input shaft axis of rotation 66 relative to the input shaft 64. In the second decoupling state, both gear wheels 80 and 82 can be rotated about the input shaft axis of rotation 66 relative to the input shaft 64. In particular, for example, the respective switching device 124, 126 comprises a respective selector sleeve, which in particular can be moved along the respective input shaft axis of rotation 62, 66 relative to the respective input shaft 60, 64, in particular between respective coupling positions effecting the respective coupling states and a respective decoupling position effecting the respective decoupling state.

Furthermore, it is preferably provided that the axis of rotation of the countershaft 112, also referred to as the countershaft axis of rotation 110, the output shaft axis of rotation 70 and the differential gear axis of rotation 42 are arranged in a first common plane.

The gear unit 58 has a first partial gear 128, which comprises at least the first switchable spur gear pair 117 and the second switchable spur gear pair 118. In the embodiment shown in FIG. 1, it is the case that the first partial gear 128 also comprises the third switchable spur gear pair 120 and the fourth switchable spur gear pair 122.

It can be seen that the countershaft 110 and the countershaft gears 114 and 116 are also arranged, in particular in each case completely, in the drive housing 84.

In the embodiment shown in FIG. 1, the gear unit 58 also has a second partial gear 130, which is arranged in the torque flow and is connected downstream of the first partial gear 128 with respect to the torque flow. This means that the partial gears 128 and 130 are arranged in the torque flow, with the partial gear 130 being arranged downstream of the partial gear 128 and upstream of the differential gear 40.

The second partial gear 130 comprises the output shaft 68 and, particularly advantageously, a planetary gear set 132 arranged coaxially to the output shaft 68.

The planetary gear set 132 has, in turn particularly advantageously, exactly one sun gear 134, which is arranged coaxially to the output shaft 68. The sun gear 134 is or can be permanently connected to a sun gear shaft 135 in a torsionally rigid manner. The planetary gear set 132 also has exactly one ring gear 136 and exactly one planet carrier 138, also referred to as a spider, wherein the ring gear 136 is a second transmission element and the planet carrier 138 is a third transmission element of the planetary gear set 132. The transmission elements of the planetary gear set 132 are arranged coaxially to each other and, in particular, if they are not connected to the housing device 34 in a torsionally rigid manner, can be rotated about a planetary gear set axis of rotation 140 relative to the housing device 34. Furthermore, it is the case that, in particular when the transmission elements are not connected to one another in a torsionally rigid manner, the transmission elements can be rotated relative to one another about the planetary gear set axis of rotation 140. Since the transmission elements are arranged coaxially to each other and coaxially to the output shaft 68, the planetary gear set axis of rotation 140 coincides with the output shaft axis of rotation 70.

In the embodiment shown in FIG. 1, the planet carrier 138 is permanently connected to the output shaft 68 in a torsionally rigid manner. The output shaft 68 is thereby a hollow shaft through which the solar gear shaft 135 passes. The ring gear 136 is advantageously designed as a second hollow shaft or, in particular, permanently, connected to a second hollow shaft in a torsionally rigid manner, whereby the sun gear shaft 135 advantageously also passes through the second hollow shaft.

A third switching device 142 is preferably assigned to the planetary gear set 132. By means of the third switching device 142, the planetary gear set 132 can be switched so that two different gear ratios can be represented by means of the planetary gear set. Two switching states can preferably be realized by means of the third switching device: on the one hand, a torsionally rigid connection of two elements of the elements of the planetary gear set 132, which is referred to as a locking of the planetary gear set 132, and on the other hand, a torsionally rigid connection of one element of the elements of the planetary gear set to the housing device 34.

In the embodiment shown in FIG. 1, the third switching device 142 can be switched between at least a fifth coupling state, at least a sixth coupling state and at least a third decoupling state. In the fifth coupling state, the ring gear 136 is connected to the housing device 34, in particular to the drive housing 84, in a torsionally rigid manner by means of the third switching device 142, in particular via the second hollow shaft, in particular while the sun gear 134 and the planet carrier 138 can be rotated about the planetary gear set axis of rotation 140 relative to one another and relative to the housing device 34 and relative to the ring gear 136. Thus, in the fifth coupling state, the switching device 142 is or functions as a brake or a brake switching element, since in the fifth coupling state the ring gear 136 is connected to the housing device 34 in a torsionally rigid manner.

In the sixth coupling state, the sun gear 134 is connected to the ring gear 136 in a torsionally rigid manner by means of the third switching device 142, in particular via the sun gear shaft 135, so that in the sixth coupling state the planetary gear set 132, i.e., the transmission elements of the planetary gear set 132, are locked together by means of the switching device 142. Thus, in the sixth coupling state, the switching device 142 is or functions as a locking switching element, by means of which the transmission elements of the planetary gear set 132 are locked together, so that, in particular when the planetary gear set 132 is driven, in particular via the sun gear 134, the transmission elements rotate together and thus as a block, and thus rotate together about the planetary gear set axis of rotation 140 relative to the housing device 134.

In the third decoupling state, however, the ring gear 136 is not connected to either the housing device 34 or the sun gear 134 in a torsionally rigid manner by means of the third switching device 142, so that in the third decoupling state the third switching device 142 permits relative rotation between the transmission elements of the planetary gear set 132, in particular in pairs, about the planetary gear set axis of rotation 140. It can be seen that the planetary gear set 132 also has planet gears 144, which are held rotatably on the spider. The respective planet gear 144 meshes with the ring gear 136 and with the sun gear 134.

In the embodiment shown in FIG. 1, the third gear wheel 76 is or can be connected to the sun gear shaft 135 in a torsionally rigid manner, in particular permanently. It is further provided that the fourth gear wheel 87 is or can be connected to the output shaft 68 in a torsionally rigid manner, in particular permanently. The third gear wheel 76 meshes with an output gear wheel 146 of the gear unit 58, wherein the output gear wheel 146, which is also referred to simply as the output gear, is or can be connected to the countershaft 110 in a torsionally rigid manner, in particular permanently.

It can be seen that the sun gear shaft 135 is at least partially accommodated in the drive housing 84. The gear wheels 76 and 78 and the output gear 146 are also accommodated, in particular in each case completely, in the drive housing 84. The planetary gear set 132 and thus its transmission elements are also accommodated, in particular completely, in the drive housing 84. Furthermore, it can be seen that the countershaft 110 can be driven by the respective gear wheel 72, 74, 80, 82 via the respective countershaft gear 114, 116, wherein the respective gear wheel 72, 74, 80, 82 can be driven by the input shaft 60, 64, and thus by the rotor 24, 30, in particular via the switching device 124, 126.

The output gear 146 can thereby be driven by the countershaft 110, and the third gear wheel 76 can be driven by the output gear 146, wherein the sun gear shaft 135 can be driven by the third gear wheel 76. Thus, the respective torque provided by the respective electric machine 20, 26 via its rotor 24, 30 can be transmitted via the gear wheel 76 to the sun gear shaft 135 and via this to the sun gear 134, whereby the sun gear shaft 135 and thus the sun gear 134 can be driven and can thus be rotated about the planetary gear set axis of rotation 140 relative to the housing device 34.

The third gear wheel 76 is thus an input gear of the second partial gear 130. The respective torque provided by the respective electric machine 20, 26 can be introduced into the second partial gear 130 via this input gear.

The fourth gear wheel 78 is an output gear of the second partial gear 130. The respective torque provided by the respective electric machine 20, 26 can be transmitted out of the partial gear 130 via this output gear and, in particular, can be transmitted to the differential gear 40 and thus introduced into the differential 38 via the differential gear 40, whereby the differential gear 40 or the differential 38 can be driven and can thus be rotated about the differential gear axis of rotation 42 relative to the housing device 34.

In order to be able to keep the installation space requirement particularly low, the planetary gear set 132 is arranged axially overlapping at least with respect to the first rotor 24 and preferably also with respect to the second rotor 30. Furthermore, it is preferably provided that the first machine's axis of rotation 32, also referred to as the axis of rotation of the first rotor 24, and the second machine's axis of rotation 36, also referred to as the axis of rotation of the second rotor 30, are arranged in a common, second plane. It is preferably provided that the first plane and the second plane are perpendicular to each other. A gear ratio, also referred to as i, is preferably considered 1 starting from the differential gear 40 towards the respective axle shaft 48, 50, so that the differential gear 40 and axle shafts 48 and 50 preferably rotate at the same speed, in particular when the differential lock 56 is activated.

In the present case, the first partial gear 128 also comprises the countershaft 110, the countershaft gears 114 and 116 and the output gear wheel 146, which is thus an output gear wheel of the first partial gear 128, also referred to as an output gear. Thus, the respective torque provided by the respective electric machine 20, 26 is transmitted out of the first partial gear 128 via the output gear 146 and transferred to the gear wheel 76 and introduced into the second partial gear 130 via this.

The first common plane mentioned above can be seen in FIG. 2 and is referred to as E1. The second common plane can also be seen in FIG. 2 and is referred to as E2.

Figures 2, 3:
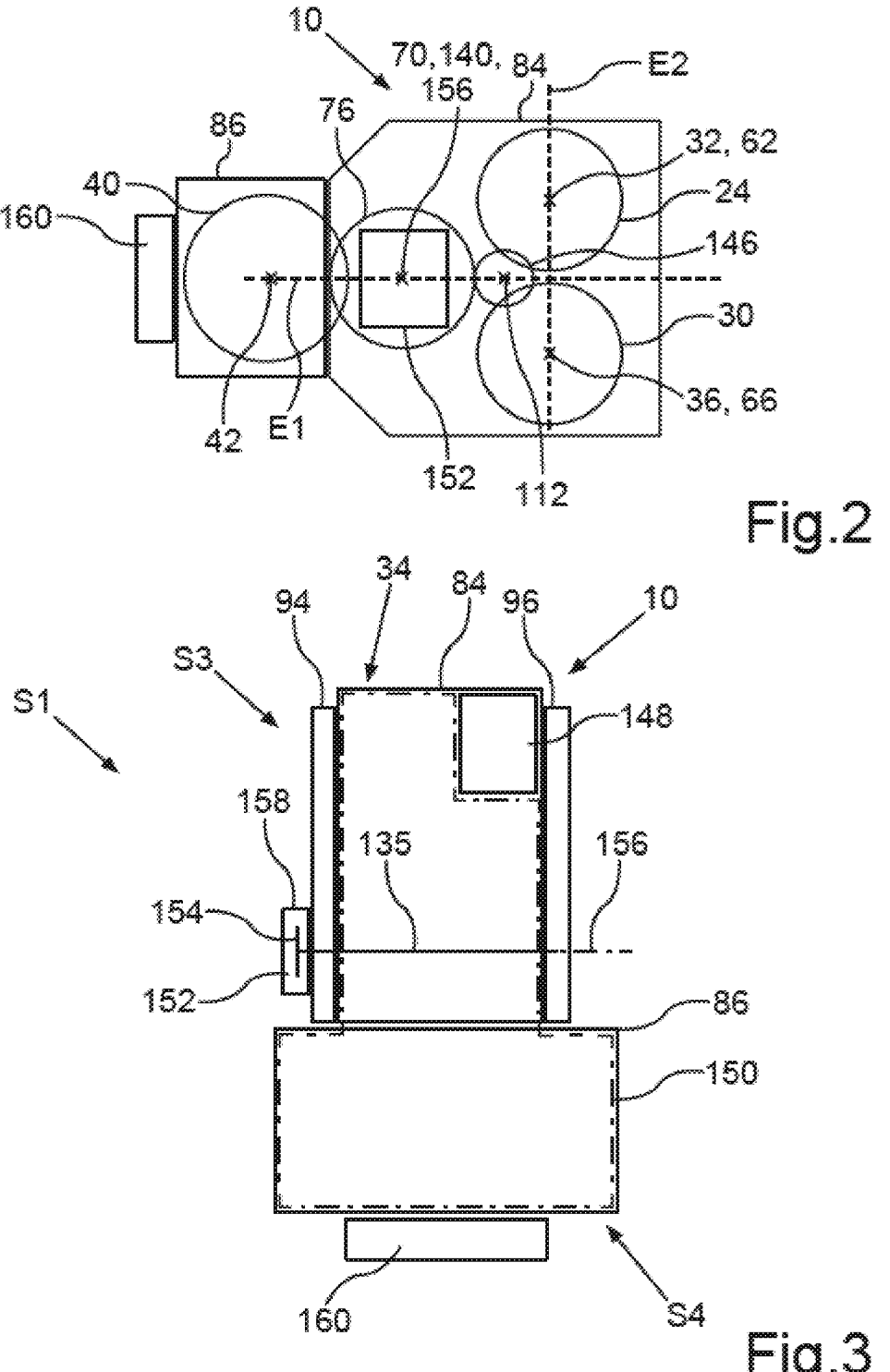
FIG. 2 shows a schematic side view of the drive system.
FIG. 3 shows a further schematic representation of the electric drive system.

It can be seen from FIG. 3 that the electric drive system 10 has a first oil chamber 148, which is designed to cool and lubricate the rotors 24 and 30. The electric drive system 10 also comprises a second oil chamber 150 formed separately from the first oil chamber 148, which is formed for cooling and lubricating the gear unit 58 and the differential 38. This means in particular that the oil chambers 148 and 150 can each be supplied with a lubricant and coolant in the form of oil, in particular in such a way that the oil can be introduced into the respective oil chamber 148, 150. Preferably, a first oil supply system is provided for the first oil chamber 148, and a second oil supply system separate from the first oil supply system is provided for the second oil chamber 150.

Alternatively, but not shown here, the oil with which the respective oil chamber 148, 150 is supplied can be conducted via the respective oil chamber 148, 150 or through the respective oil chamber 148, 150 to the rotors 24 and 30 or to the gear unit 58 and the differential 38, in order to thereby supply the rotors 24 and 30, the gear unit 58 and the differential 38 with the oil and thereby lubricate and cool them. In this alternative, both oil chambers 148, 150 are supplied by one and the same oil supply system.

In the embodiment shown in FIG. 3, the electric drive system 10 has a mechanical oil pump 152 which can be driven by the gear unit 58, in particular mechanically, and by means of which the second oil chamber 150 can be supplied with the oil. This means that by driving the mechanical oil pump 152, the oil can be conveyed or, moreover, and in particular into the second oil chamber 150 and/or through the oil chamber 150. The oil pump 152 thereby has a pump impeller 154, shown schematically in FIG. 3, which can be rotated about a pump impeller axis of rotation 156 relative to the housing device 34. The pump impeller 154 is driven mechanically by the gear unit 58 and can thus be rotated about the pump impeller axis of rotation 156 relative to the housing device 34, whereby the oil is conveyed and the second oil chamber 150 is supplied with the oil conveyed by means of the pump impeller 154. This means that the oil is conveyed by means of the pump impeller 154 by driving the pump impeller 154. The mechanical oil pump 152 has a pump housing 158, which can be a component of the housing device 34. The pump housing 158 is advantageously formed separately from the drive housing 84 and separately from the axle housing 86 and also separately from the covers 94 and 96. For example, the pump housing 158 is connected, in particular directly, to the drive housing 84. The pump impeller 154 is thereby accommodated, in particular rotatably, in the pump housing 158.

In the embodiment shown in the figures, the pump impeller 154 is permanently connected to the sun gear shaft 135 in a torsionally rigid manner. Thus, the pump impeller 154 is arranged coaxially to the output shaft 68 or the sun gear shaft 135, so that the pump impeller axis of rotation 156 coincides with the output shaft axis of rotation 70 and the planetary gear set axis of rotation 140.

Furthermore, it can be seen from FIGS. 1 and 3 that the mechanical oil pump 152 and thus the pump housing 158 and preferably also the pump impeller 154 is arranged on the side S1 and thereby on a side S3 of the first cover 94 facing away from the gear unit 58. Thus, the cover 94 is preferably arranged between the pump housing 158 and the drive housing 84 as viewed in a direction of the pump impeller axis of rotation 156 and thereby preferably also between the pump impeller 154 and the drive housing 84. This means that it is particularly conceivable, for example, that the pump housing 158 is connected, in particular directly, to the cover 94, in particular by means of a fourth flange joint and/or in a fourth flange face surface, which extends, for example, perpendicular to the pump impeller axis of rotation 156. Furthermore, it is preferably provided that a separate oil cooler, not shown in the figures, is arranged in the pump housing 158 of the mechanical oil pump 152, by means of which the oil conveyed by means of the pump impeller 154 and thus by means of the mechanical oil pump 152 can be cooled, in particular on its way from the pump impeller 154 or the oil pump 152 to the second oil chamber 150.

Furthermore, the electric drive system 10 has a cooling module 160 provided in addition to the mechanical oil pump 152, which is arranged on a side S4 of the axle housing 86 facing away from the gear unit 58, wherein the side S4 faces away from the sides S1, S2 and S3. In particular, it is conceivable that the cooling module 160 is formed separately from the housing device 134 and separately from the covers 94 and 96. For example, the cooling module 160 is connected, in particular directly, to the axle housing 86. The cooling module 160 preferably has an electric pump, not shown in the figures, which is also referred to as an electric oil pump. The oil can be conveyed to and in particular into the first oil chamber 148 by means of the electric pump. In other words, the oil can be conveyed by means of the electric oil pump, whereby the first oil chamber 148 can be supplied with the oil conveyed by means of the electric oil pump. To put it in other words again, the electric pump and thus the cooling module 160 is thus designed to supply the first oil chamber 148 with the oil. The cooling module 160 has a second oil cooler, provided in particular in addition to the first oil cooler, by means of which the oil conveyed by means of the electric oil pump can be cooled, in particular on its way to the first oil chamber 148. The first oil chamber 148 and the second oil chamber 150 are preferably completely separated from one another in such a way that no oil can be exchanged from one of the two oil chambers 148, 150 into the other of the two oil chambers 148, 150. Different types of oil are preferably used in the two oil chambers 148 and 150.

LIST OF REFERENCE SIGNS

10 Electric drive system
12 Axle
14 Wheel
16 Double arrow
18 Arrow
20 First electric machine
22 First stator
24 First rotor
26 Second electric machine
28 Second stator
30 Second rotor
32 First machine's axis of rotation
34 Housing device
36 Second machine's axis of rotation
38 Differential
40 Differential gear
41 Differential cage
42 Differential gear axis of rotation
44 Output gear
46 Output gear
48 Axle shaft
50 Axle shaft
52 Compensating gear
54 Compensating gear
56 Differential gear
58 Gear unit
60 First input shaft
62 First input shaft axis of rotation
64 Second input shaft
66 Second input shaft axis of rotation
68 Output shaft
70 Output shaft axis of rotation
72 First gear wheel
74 Second gear wheel
76 Third gear wheel
78 Fourth gear wheel
80 Fifth gear wheel
82 Sixth gear wheel
84 Drive housing
86 Axle housing
88 First flange joint
90 First flange
92 Second flange
94 First cover
96 Second cover
98 Second flange joint
100 Third flange
102 Fourth flange
104 Third flange joint
106 Fifth flange
108 Sixth flange
110 Countershaft
112 Countershaft axis of rotation
114 Countershaft gear

116 Countershaft gear
117 First spur gear pair
118 Second spur gear pair
120 Third spur gear pair
122 Fourth spur gear pair
124 Switching device
126 Switching device
128 First partial gear
130 Second partial gear
132 Planetary gear set
134 Sun gear
135 Sun gear shaft
136 Ring gear
138 Planet carrier
140 Planetary gear set axis of rotation
142 Switching element
144 Planet gear
146 Output gear
148 First oil chamber
150 Second oil chamber
152 Mechanical oil pump
154 Pump impeller
156 Pump impeller axis of rotation
158 Pump housing
160 Cooling module
E1 First plane
E2 Second plane
F1 First flange face surface
F2 Second flange face surface
F3 Third flange face surface
S1 First side
S2 Second side
S3 Third side
S4 Fourth side

The invention claimed is:
1. Electric drive system (10) for a motor vehicle, showing:
a first electric machine (20) with a first rotor (24), via which torques can be provided by the first electric machine (20),
a differential (38) with a differential gear (40), via which the torques can be introduced into the differential (38),
a gear unit (58) which is provided in addition to the differential (38) and which is arranged in the torque flow between the first rotor (24) and the differential gear (40) with respect to a torque flow emanating from the first electric machine (20), via which the torques can be transmitted from the first rotor (24) to the differential gear (40) and can be introduced into the differential (38) via the differential gear (40), and a first input shaft (60), an output shaft (68) arranged parallel and axially offset to the first input shaft (60) and at least two gear wheels (72, 74) arranged coaxially to the first input shaft, (60), namely a first gear wheel (72) and a second gear wheel (74), and two gear wheels (76, 78) arranged coaxially to the output shaft (68), namely a third gear wheel (76) and a fourth gear wheel (78),
a drive housing (84) formed in one piece in which the first electric machine (20) and the gear unit (58) are each at least partially accommodated,
an axle housing (86) in which the differential (38) is accommodated, wherein
an axis of rotation (32) of the first rotor (24), an axis of rotation (70) of the output shaft (68) and an axis of rotation (42) of the differential gear (40) a arranged parallel and axially offset to one another, the drive housing (84) the axle housing (86) are directly connected to one another by means of a first flange joint (88), a first flange, face surface (F1) of the first flange joint (88) is arranged parallel to the axis of rotation (42) of the differential gear (40), characterized in that:

the first rotor (24) and the gear wheels (72, 74, 76, 78) of the gear unit (58) are arranged completely within the drive housing (84), a first cover (94) a second cover (96) are provided, the first cover (94) and the drive housing (84) are directly connected to one another by means of a second flange joint (98), the second cover (96) and the drive housing (84) are directly connected to each other by means of a third flange joint (104), and a second flange face surface (F2) of the second flange joint (98) and a third flange face surface (F3) of the third flange joint (104) are arranged perpendicular to the axis of rotation (42) of the differential gear (40), characterized in that:

the gear unit (58) has a countershaft (110) arranged parallel and axially offset to the first input shaft (60) and parallel and axially offset to the output shaft (68), wherein a first switchable spur gear pair (117) is provided, which comprises the first gear wheel (72) and a first countershaft gear wheel (114) arranged coaxially to the countershaft (110), and wherein a second switchable spur gear pair (118) is provided, which comprises the second gear wheel (74) and a second countershaft gear wheel (116) arranged coaxially to the countershaft (110).

2. Electric drive system (10) according to claim 1, characterized in that an axis of rotation (112) of the countershaft (110), the axis of rotation (70) of the output shaft (68) and the axis of rotation (42) of the differential gear (40) are arranged in a first common plane (E1).

3. Electric drive system (10) according to claim 2, characterized in that the gear unit (58) has a first partial gear (128) comprising the first switchable spur gear pair (117) and the second switchable spur gear pair (118) and a second partial gear (130) arranged in the torque flow and connected downstream of the first partial gear (128) with respect to the torque flow, which second partial gear comprises the output shaft (68) and a planetary gear set (132) arranged coaxially with the output shaft (68).

4. Electric drive system (10) according to claim 3, characterized in that the planetary gear set (132) is arranged axially overlapping with the first rotor (24).

5. Electric drive system (10) according to claim 3, characterized by a second electric machine (26) with a second rotor (30) arranged inside the drive housing (84), from which the differential gear (40) can be driven via the gear unit (58).

6. Electric drive system (10) according to claim 5, characterized in that:

the first partial gear (128) comprises a second input shaft (64) arranged coaxially to the second rotor (30), a third switchable spur gear pair (120) is provided, comprising a fifth gear (80) arranged coaxially with the second input shaft (64) and the first countershaft gear (114), and a fourth switchable spur gear pair (122) is provided, comprising a sixth gear (82) arranged coaxially with the second input shaft (64) and the second countershaft gear (116).

7. Electric drive system (10) according to claim 6, characterized in that the axis of rotation (32) of the first rotor (24) and an axis of rotation (36) of the second rotor (30) are arranged in a second common plane (E2).

8. Electric drive system (10) according to claim 6, characterized in that the second common plane (E2) is arranged perpendicular to the first common plane (E1).

9. Electric drive system (10) according to claim 6, characterized by a first oil chamber (148) formed for cooling and lubricating the first rotor (24), and a second oil chamber (150) formed separately from the first oil chamber (148) and formed for cooling and lubricating the gear unit (58) and the differential (38).

10. Electric drive system (10) according to claim 9, characterized by a mechanical oil pump (152), which can be driven by the gear unit (58) and is arranged on a side (S3) of the first cover (94) facing away from the gear unit (58), for supplying the second oil chamber (150) with oil.

11. Electric drive system (10) according to claim 10, characterized in that the mechanical oil pump (152) has a pump housing (158) and a pump impeller (154) which is arranged inside the pump housing (158), is arranged coaxially with the output shaft (68) and is connected in a torsionally rigid manner to a shaft of the planetary gear set (132).

12. Electric drive system (10) according to claim 11, characterized in that a first oil cooler for cooling the oil is arranged inside the pump housing (158).

13. Electric drive system (10) according to claim 9, characterized by a cooling module (160) arranged on a side (S4) of the axle housing (86) facing away from the gear unit (48) and comprising an electric pump and a second oil cooler for supplying the first oil chamber (148) with oil.

* * * * *